United States Patent [19]

Hagner

[11] Patent Number: 4,648,632
[45] Date of Patent: Mar. 10, 1987

[54] HIGH PRESSURE FLOW LINE CONNECTION

[75] Inventor: Robert C. Hagner, Houston, Tex.

[73] Assignee: Bas-Tex Corporation, Houston, Tex.

[21] Appl. No.: 506,698

[22] Filed: Jun. 22, 1983

Related U.S. Application Data

[63] Continuation-in-part of Ser. No. 411,498, Aug. 25, 1982, Pat. No. 4,452,474.

[51] Int. Cl.⁴ .............................................. F16L 25/00
[52] U.S. Cl. ............................... 285/334.1; 285/334.4; 285/363; 285/910; 285/93
[58] Field of Search ................. 285/334.1, 334.4, 368, 285/363, DIG. 11, 910, 93; 277/235

[56] References Cited

U.S. PATENT DOCUMENTS

| | | | |
|---|---|---|---|
| 1,301,245 | 4/1919 | Fox | 285/334.1 X |
| 1,839,340 | 1/1932 | Pittlick | 285/DIG. 18 |
| 2,046,597 | 7/1936 | Abegg | 285/334.1 X |
| 2,582,995 | 1/1952 | Laurent | 285/DIG. 11 |
| 2,687,229 | 8/1954 | Laurent | 285/363 X |
| 2,760,673 | 8/1956 | Laurent | 285/334.1 X |
| 3,797,835 | 3/1974 | Wehner | 285/334.4 X |
| 3,873,105 | 3/1975 | Wehner | 285/334.4 X |
| 4,452,474 | 6/1984 | Hagner | 285/334.1 |

FOREIGN PATENT DOCUMENTS 6805184 10/1968 Netherlands ................ 285/DIG. 18

*Primary Examiner*—Dave W. Arola
*Attorney, Agent, or Firm*—Bernard A. Reiter

[57] ABSTRACT

Disclosed is a high pressure flow line connection. The connection includes a tubular male member, a tubular female member and a seal ring positioned between the male and female members. The male and female members have mating frusto-conical tapered surfaces, with the angle of taper of the female member being less than that of the male member. The seal ring has inner and outer tapered surfaces having angles of taper equal to those of the male and female members, respectively. The seal ring includes a radially outwardly extending lip adjacent the maximum outside diameter thereof. The male member, female member, and seal ring are cooperatively figured such that the seal ring lip remains spaced apart from the female member but optimum sealing engagement is achieved.

6 Claims, 2 Drawing Figures

HIGH PRESSURE FLOW LINE CONNECTION

This is a continuation-in-part of my co-pending U.S. patent application Ser. No. 411,498, filed Aug. 25, 1982 and now U.S. Pat. No. 4,452,474.

BACKGROUND OF THE INVENTION

A. Field of the Invention

The present invention relates generally to high pressure flow line connections or closures, and more particularly to high pressure flow line connections or closures which include a male member having a tapered annular exterior surface, a female member having a tapered annular interior surface, and a seal ring of generally trapezoidal cross-section positioned therebetween.

B. Description of the Prior Art

In the field of high pressure fluid handling, as for example in industrial heat exchangers, there have been developed a number of connection or closure arrangements for connecting together flow lines or conduits. One arrangement includes a male member, a female member, and a seal ring. The male member has an end with an inwardly tapered frusto-conical exterior surface. The female member has an end with an outwardly tapered frusto conical interior surface having an angle of taper with respect to the axis of the member that is less than the angle of taper of the end of the male portion. The seal ring is generally trapezoidal in cross-section and has an outer surface with an angle of taper substantially equal to that of the inner surface of the female member, and an inner surface having an angle of taper that is substantially equal to the angle of taper of the end of the male member. As the male and female members are urged into mating engagement, as, for example by flanges, the seal ring is wedged tightly therebetween.

A shortcoming of the trapezoidal seal ring connection of the prior art is in the difficulty encountered in properly seating the seal ring between the mating surfaces of the male and female members. If the seal ring is axially misaligned when the parts are put together, the seal ring will be subjected to uneven stresses as the male and female members are urged into tight mating engagement, which may cause the seal ring to fail by fracturing or curling. Additionally, if the seal ring is axially misaligned, but does not fracture or curl, the connection still may leak, which at extreme high pressures may be disastrous.

An improved connection or closure of the type described was developed in which the seal ring was formed to include a radially extending lip. The lip provided a visual indication of the proper alignment of the parts as the male and female members were urged into engagement. However, the prior lipped trapezoidal ring connections or closures were subject to failure because of improper size relationships between the male member, seal ring, and female member. During the tightening of the connection, the lip moves toward the female member. If the initial spacing between the lip and female member is too small, then during tightening, the lip and female member will contact and the lip may be sheared off or the forces exerted by the female member on the lip may cause the ring to fracture. If, on the other hand, the initial spacing between the lip and the female member is too great, then there may be insufficient surface contact between the seal ring and female member to provide an adequate seal.

An improved connection or closure including a seal ring having a radially outwardly extending lip is disclosed in copending U.S. patent application Ser. No. 411,498, filed Aug. 25, 1982, wherein the seal ring, male member, and female member are sized relative to each other such that an adequate seal is developed and the lip of the seal ring remains spacial apart from the end of the female member. However, in extreme high pressure uses, the required bolt tensions are so high that the lip still may be sheared off.

It is, therefore, an object of the present invention to provide a connection or closure that overcomes the shortcomings of the prior art. More specifically, it is an object of the present invention to provide a connection or closure arrangement wherein the combination of the male member, seal ring with a radially outwardly extending lip, and female member are sized relative to each other such that proper axial alignment among the parts is maintained and an adequate seal is achieved and the lip remains spaced apart from the end of the female member regardless of bolt tension.

SUMMARY OF THE INVENTION

The foregoing and other objects are achieved by the high pressure flow line connection of the present invention. The connection includes a male member, a female member, and a seal ring. The male member has an end portion with an inwardly tapered frusto-conical exterior surface having an angle of taper. The male member exterior surface has a maximum outside diameter and a minimum outside diameter. The minimum and maximum outside diameters are subject to a manufacturing tolerance. The male member includes a radially outwardly extending flange adjacent the maximum outside diameter of the end portion. The female member includes an end portion having an outwardly tapered frusto-conical interior surface having an angle of taper that is less than the angle of taper of the male member end portion. The female member end portion interior surface terminates at an outer end having a maximum inside diameter and at an inner end having a minimum inside diameter with a radially inwardly extending shoulder adjacent thereto. The female member has an axial depth. The seal ring has a frusto-conical inner surface having an angle of taper substantially equal to the angle of taper of the male member end portion and a frusto-conical outer surface having an angle of taper substantially equal to the angle of taper of the female member end portion. The seal ring has an annular rim which extends radially outwardly from the seal ring outer surface adjacent the maximum outside diameter.

The respective relative dimensions of the seal ring and frusto conical surfaces of the male and female members are selected so as to maximize the effectiveness of the seal created and minimize the chances that the seal ring may be axially misaligned or become damaged during assembly and use. More specifically, the axial length of the seal ring between the lip and maximum outside diameter end is substantially equal to the depth of the female member. The maximum inside diameter of the seal ring interior surface is less than the maximum outside diameter of the male member end portion, while the minimum inside diameter of the seal ring is less than the minimum outside diameter of the male member end portion. The maximum outside diameter of the seal ring outer surface adjacent the lip is greater than the maximum inside diameter of the female member end portion, such that the lip remains spaced apart from the end of the end portion of the female member as the male and female members are urged together. However, no matter how tightly the male and female members are urged together, the end of the seal ring will engage the shoulder of the female member before the lip shears.

DESCRIPTION OF THE PREFERRED EMBODIMENT

Figure 1:
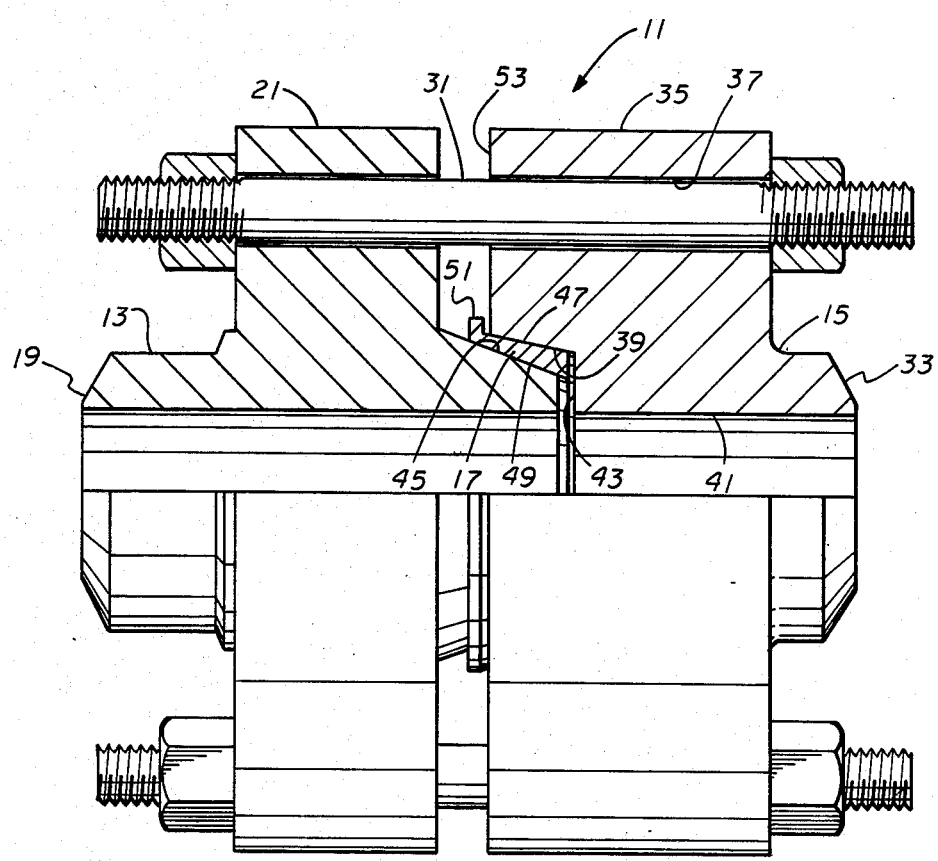
FIG. 1 is a quarter sectional view of a high pressure flow line connection incorporating the present invention.

Referring now to the drawings, and first to FIG. 1, a high pressure flow line connection which embodies the present invention is designated generally by the numeral 11. Connection 11 includes generally a male member 13, a female member 15, and a seal ring 17.

Male member 13 is generally tubular and is adapted for connection to a high pressure conduit by welding or the like at 19. Male member 13 includes a radially outwardly extending flange 21 which has a plurality of bolt holes, including a bolt hole 31 therein.

Female member 15 is generally tubular and is adapted for attachment to a high pressure conduit as by welding at 33. Female member 15 includes a radially extending unitary flange 35 which has a plurality of bolt holes, including bolt hole 37 therein. Flange 35 is thus adapted to be interconnected with flange ring 21 by a plurality of bolts or the like, thereby to connect and urge axially together male member 13 and female member 15.

Female member 15 includes a radially enlarged outwardly tapered end portion 39. End portion 39 forms a frusto-conical interior surface having an angle of taper with respect to the axis of female member 15. End portion 39 is connected to the bore 41 of female member 15 by a radially inwardly extending shoulder 43.

Male member 13 includes an inwardly tapered end portion 45 which forms a frusto conical exterior surface. The angle of taper of end portion 45 with respect to the axis of male member 13 is greater than the angle of taper of end portion 39 of female member 15.

Seal ring 17 includes a frusto conical outer surface 47 and a frusto conical inner surface 49. The angles of taper of outer surface 47 and inner surface 49 are substantially equal to the angles of taper of end portion 39 of female member 15 and end portion 45 of male member 13, respectively. Seal ring 17 is thus wedged between end portion 45 of male member 13 and end portion 39 of female member 15. Internal pressure within connection 11 acts on seal ring 17 to urge seal ring into tighter engagement with end portions 45 and 39, thereby to make seal ring 17 effectively self-energizing. The greater the internal pressure, the more effective is the seal.

Seal ring 17 includes a radially outwardly extending lip 51. Lip 51 is positioned on seal ring 17 so as to be spaced apart from the end 53 of female member 15 and flange 21 of male member 13. During assembly of connection 11, the worker can inspect the position of lip 51 with respect to male member 13 and female member 15 and can verify that the spacing between lip 51 and end 53 of female member 15 is substantially equal all the way around connection 11. Lip 51 thus provides a visual indication that the parts are properly aligned.

Figure 2:
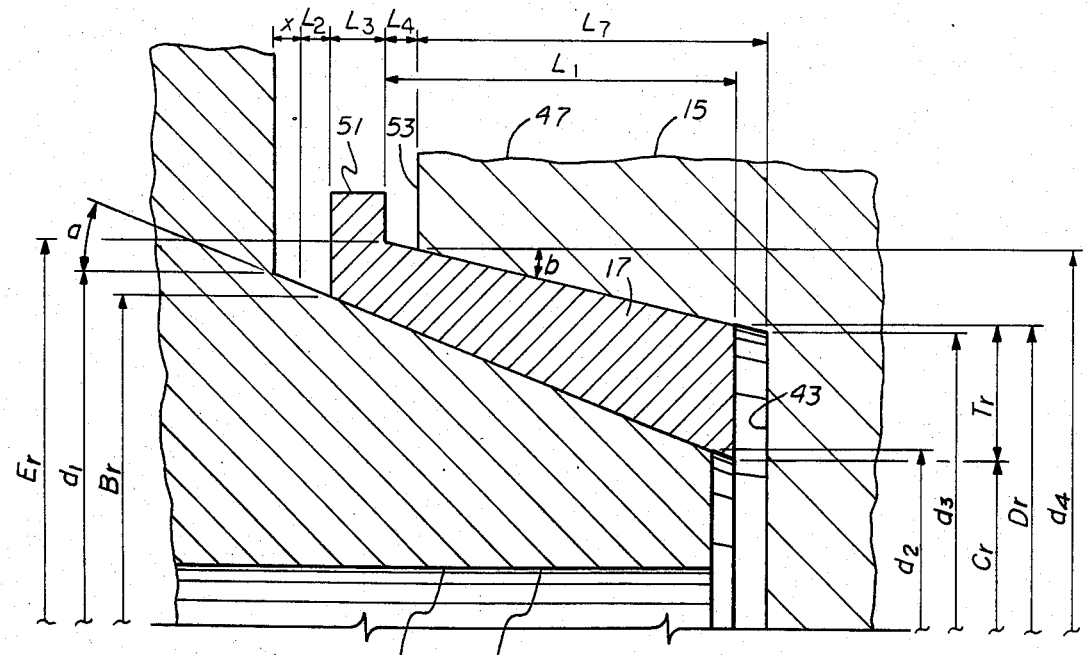
FIG. 2 is a detailed sectional view of the male member, seal ring, and female member arrangement of the preferred embodiment of the present invention.

Referring now to FIG. 2, there is illustrated the details of the construction of the preferred embodiment of the present invention. The angle of taper of end portion 45 of male member 13 is designated as angle a, and in the preferred embodiment is 20 degrees. The angle of taper of end portion 47 of female member 15 is designated angle b, and in the preferred embodiment is 10 degrees. It has been determined empirically that there is an optimum cross-sectional configuration for seal ring 17 regardless of diameter. In the optimum configuration, the axial length of seal ring 17, which is designated $L_1$, is 0.875 inches, and the maximum seal ring thickness, which is designated $T_r$, is 0.316 inches. The optimum spacing between lip 51 and end 53 of female member 15, which is designated $L_4$, is 0.151 inches. In the preferred embodiment, the thickness of lip 51, which is designated $L_3$, is 0.125 inches. For a given maximum outside diameter of male member 13, which is designated $d_1$, it is necessary to determine the axial length of end portion 45 of male member 13, the maximum inside diameter of end portion 47 of female member 15, which is designated $d_4$, the axial depth of end portion 47 of female member 15, and at least one diameter of seal ring 17, as for example the maximum inside diameter of seal ring 17, which is designated $B_r$.

In the preferred embodiment, the axial length of end portion 45 of male member 13 is equal to $L_1+L_2-L_6$, wherein $L_2$ is the axial distance between $d_1$, the maximum diameter of end portion 45, and $B_r$, the maximum inside diameter of seal ring 17, and $L_6$ is the axial distance between $d_2$, the minimum outside diameter of end portion 45, and $C_r$, the minimum inside diameter of seal ring 17. The minimum length of $L_2$ is determined by the combined manufacturing tolerances on the diameter of male member 13 and seal ring 17 and a selected spacing between flange 21 and lip 51, which spacing is identified by the letter X. For example, in the preferred embodiment, the manufacturing tolerance on the diameter of male member 13 is plus 0.000 inches and minus 0.010 inches, and the manufacturing tolerance on the diameter of seal ring 17 is plus or minus 0.003 inches. $B_r$ must always be less than $d_1$. Thus, $B_r$ must be less than $d_1$ minus the total negative tolerance of male member 13 and seal ring 17. From trigonometry, the minimum $L_2$ is eexpressed as follows:

$$L_2 = (tol_n/2) \cot a,$$

wherein $tol_n$ is the absolute value of the total negative tolerance of male member 13 and seal ring 17.

$L_6$, the distance between $C_r$, the minimum inside diameter of seal ring 17 and $D_2$, the minimum outside diameter of end portion 45 of male member 13, is equal to the combined positive manufacturing tolerances of male member 13 and seal ring 17, and is expressed mathematically as follows:

$$L_6 = (tol_p/2) \cot a,$$

wherein $tol_p$ is the absolute value of the total positive tolerance of male member 13 and seal ring 17.

The axial length of end portion 45 of male member 13 is thus $L_2+L_1-L_6$. By inspection, $D_2$, the minimum outside diameter of end portion 45 of male member 13 may be expressed as follows:

$$d_2 = d_1 - 2(L_2+L_1-L_6) \cot a.$$

Having determined the dimensions of end portion 45 of male member 13, and having been given the optimum cross-sectional configuration of seal ring 17, the remaining dimensions of seal ring 17 are determined relatively simply. From the calculation of $L_2$, it can be seen that $B_r$, the maximum inside diameter of seal ring 17 may be expressed as follows:

$$B_r = d_1 - 2(L_2 + X)\tan a = d_1 - (tol_p).$$

Similarly, the minimum inside diameter of seal ring 17 may be expressed as follows:

$$C_r = d_1 - 2(L_1'L_2 + X)\tan a.$$

The minimum outside diameter of seal ring 17, which is expressed as $D_r$, is thus expressed as follows:

$$D_r = C_r = T_r,$$

ps where $T_r$ is the maximum thickness of seal ring 17. The maximum outside diameter of seal ring 17 adjacent rim 51, which is designated $E_r$, is as follows:

$$E_r = D_r + 2(L_1 - L_3)\tan b,$$

where $L_3$, the thickness of lip 51 is given to be 0.125 inches.

Having determined the dimensions of end portion 45 of male member 13 and seal ring 17, there remains only to be computed the dimensions of end portion 47 of female member 15. The maximum inside diameter of end portion 47 of female member 15, which is designated $B_4$, must be selected so as to maintain optimum spacing between lip 51 and end 53 of end portion 47. Thus, the maximum inside diameter is expressed as follows:

$$d_4 = E_r - 2L_4 \tan b.$$

The depth of end portion 47 of female member 15, which is designated $L_7$, is selected such that the end of seal ring 17 contacts shoulder 43 before lip 51 contacts flange 53. Thus, the depth of end portion 47 is equal to the axial length of seal ring 17 less the width of lip 51, or $L_7 = L_1 - L_3$. Having determined the depth $L_7$ of end portion 47 of female member 15, the remaining dimension, $d_3$, the minimum inside diameter of end portion 47 of female member 15 is as follows:

$$d_3 = d_4 - 2L_7 \tan b.$$

It is, of course, the intention of the inventor hereof that the ambit of the present invention shall cover obvious modifications of the embodiment shown and described herein, provided that such modifications fall within the spirit and scope of the claims appended hereto.

What is claimed is:

1. A high pressure flow line connection, which comprises:

a tubular male member having an end portion with an in wardly tapered frusto-conical exterior surface having a minimum outside diameter and an angle of taper with respect to the axis of the male member and an axial length, said tapered exterior surface terminating in an end having a minimum outside diameter, said minimum and maximum outside diameters being subject to manufacturing tolerances, said male member including a radially outwardly extending flange adjacent said maximum outside diameter;

a tubular female member coaxially generally matingly aligned with said male member and including an end portion having an outwardly tapered frusto-conical interior surface having an angle of taper with respect to the axis of the female member that is less than the angle of taper of the end portion of the male member and said female member end portion interior surface terminating at an outer end having a maximum inside diameter and at an inner end having a mimimum inside diameter, said female member including a radially extending flange adjacent said maximum inside diameter and a radially inwardly extending shoulder adjacent said minimum inside diameter, said female member interior surface having an axial length between said shoulder and said female member flange;

means for urging said flanges of said male and female members toward each other;

and a seal ring including a frusto-conical inner surface having an angle of taper substantially equal to the angle of taper of the male member end portion exterior surface and a frusto-conical outer surface having an angle of taper substantially equal to the angle of taper of the female member end portion interior surface and said seal ring including an annular lip extending radially outwardly from said seal ring outer surface adjacent the maximum outside diameter of said seal ring surface, said seal ring being positioned coaxially between said male and female members with said seal ring inner surface engaging said male member end portion exterior surface and a portion of said seal ring outer surface engaging said female member end portion interior surface, said seal ring having a minimum inside diameter less than the minimum outside diameter of said male member end portion and a maximum inside diameter less than the maximum outside diameter of said male member end portion whereby when said seal ring is positioned on said male member end portion, the maximum inside diameter end of said seal ring is spaced apart from said male member flange and said minimum inside diameter end of said seal ring extends axially beyond the end of said male member, said minimum and maximum inside diameters of said seal ring being subject to manufacturing tolerances, said seal ring having an axial length between said lip and the minimum inside diameter end thereof at least equal to the depth of said end portion interior surface of said female member, and the maximum outside diameter of said seal ring outer surface adjacent said lip being greater than the maximum inside diameter of said female member end portion.

2. The high pressure flow line connection as claimed in claim 1, wherein the seal ring maximum inside diameter is less than the male member maximum outside diameter less the sum of the absolute values of the negative tolerances of the male member maximum outside diameter and the seal ring maximum inside diameter.

3. The high pressure flow line connection as claimed in claim 2, wherein the axial length of said male member end portion is equal to the sum of:

(a) the axial length of said seal ring;

(b) the negative of one-half the sum of the absolute values of the negative tolerances of the member outside diameter and the seal ring maximum inside diameter, multiplied by the cotangent of the angle of taper of the male member end portion;

(c) the negative of one-half the sum of the absolute values of the positive tolerance of the male member minimum outside diameter and the seal ring minimum inside diameter, multiplied by the cotangent of the angle of taper of the male member end portion;

(d) the product of the distance by which the lip is spaced apart from the end of the end portion of the female member, the cotangent of the angle of taper of the male member end portion, and the tangent of the angle of taper of the female member end portion; and (e) a selected spacing between the flange of the male member and the lip of the seal ring.

4. The high pressure connection as claimed in claim 1, wherein the maximum inside diameter of the female member end portion is equal to the maximum outside diameter of the seal ring outer surface adjacent the lip less the product of twice the distance by which the lip is spaced apart from the end of the female member end portion and the tangent of the angle of taper of the female member end portion.

5. The high pressure connection as claimed in claims 1, 2, 3 or 4, wherein the distance by which the lip is spaced apart from the end of the female member end portion is substantially equal to 0.150 inch.

6. The high pressure flow line connection as claimed in claim 5, wherein the axial length of the seal ring is substantially equal to 0.875 inch and the axial length of the lip is substantially equal to 0.125 inch.

* * * * *